June 13, 1950     O. FIRING     2,511,402
MACHINE FOR INJECTION MOLDING ARTICLES
Filed Dec. 12, 1946     9 Sheets-Sheet 1
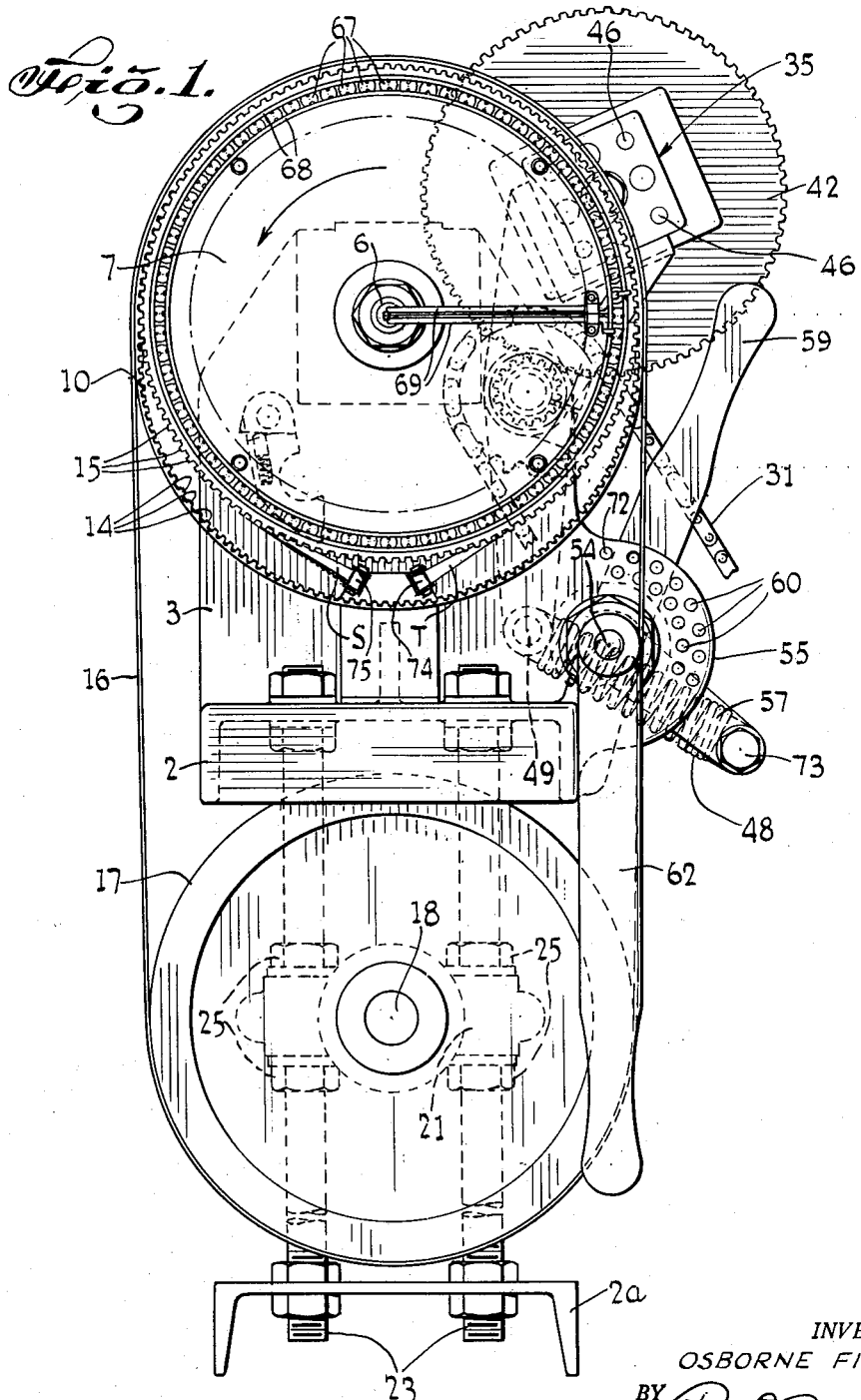
INVENTOR.
OSBORNE FIRING
BY P. E. Meech
ATTORNEY

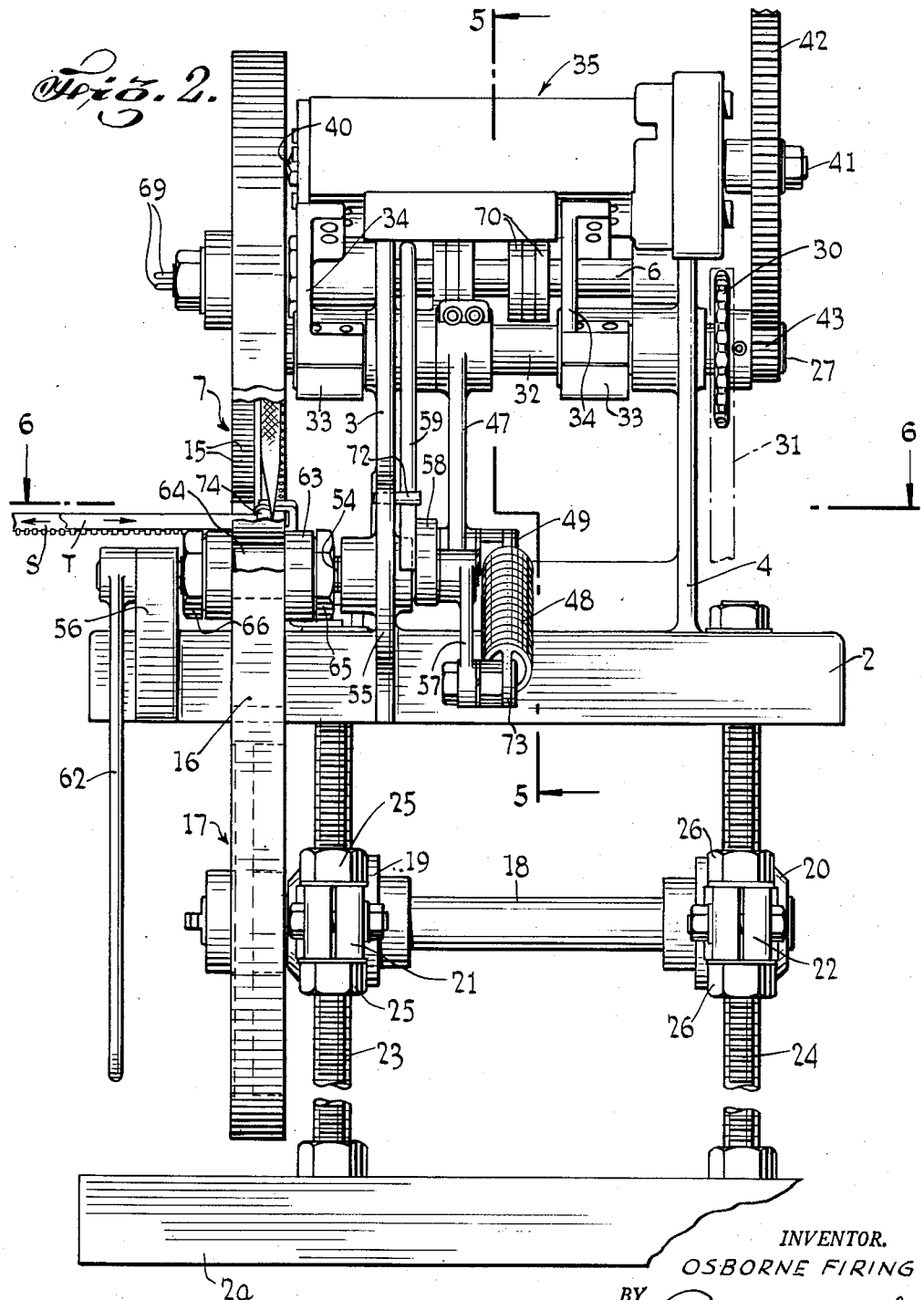

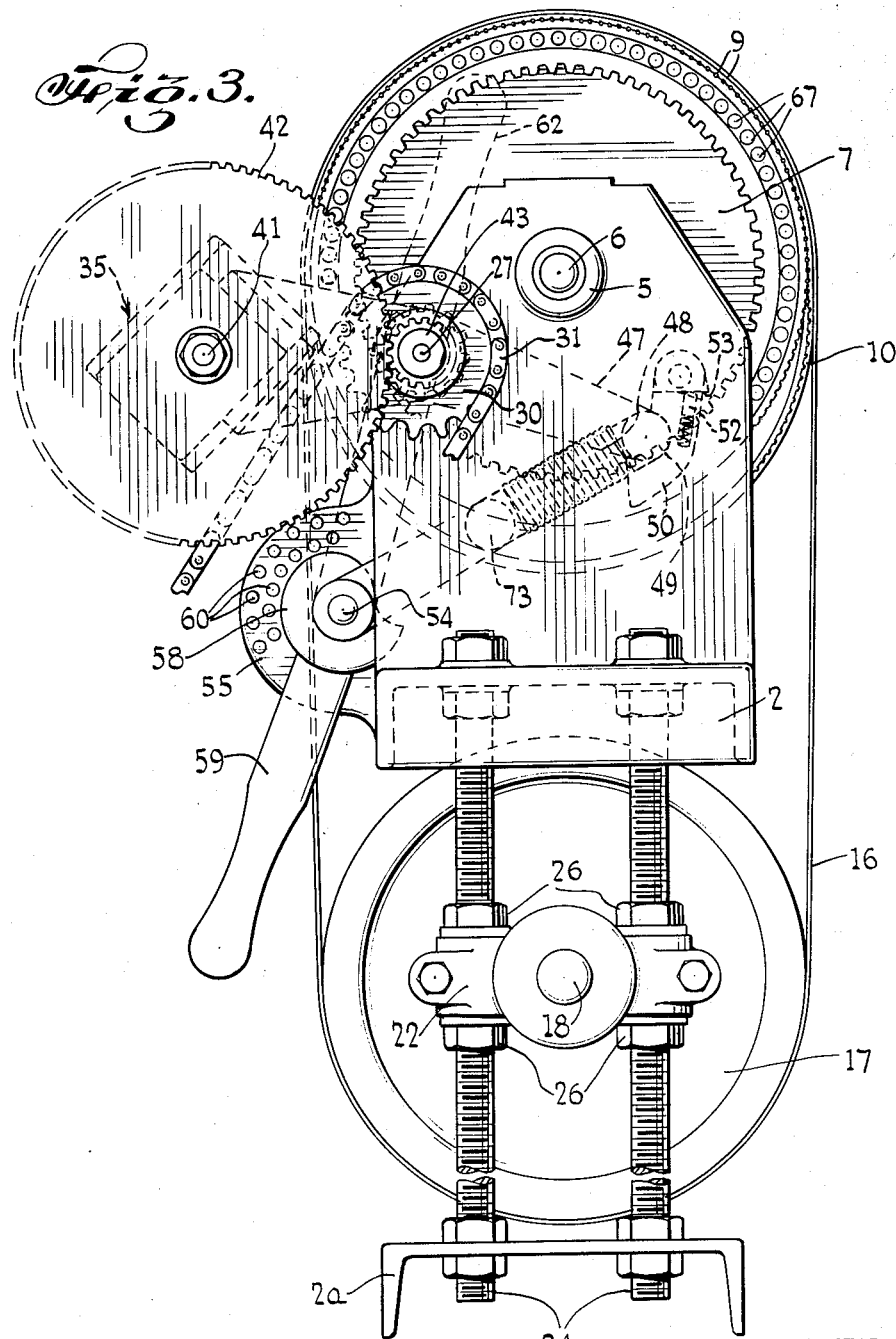

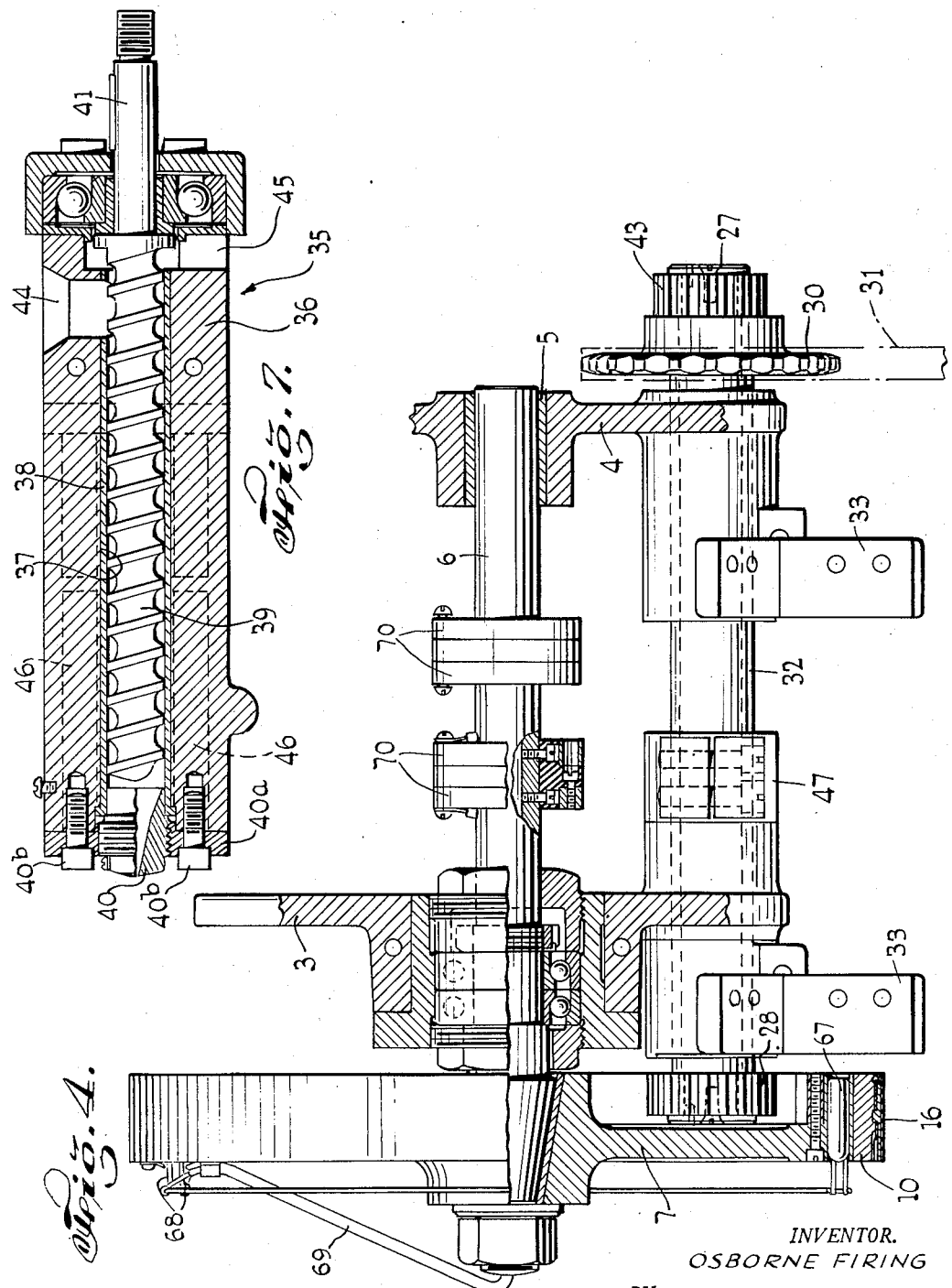

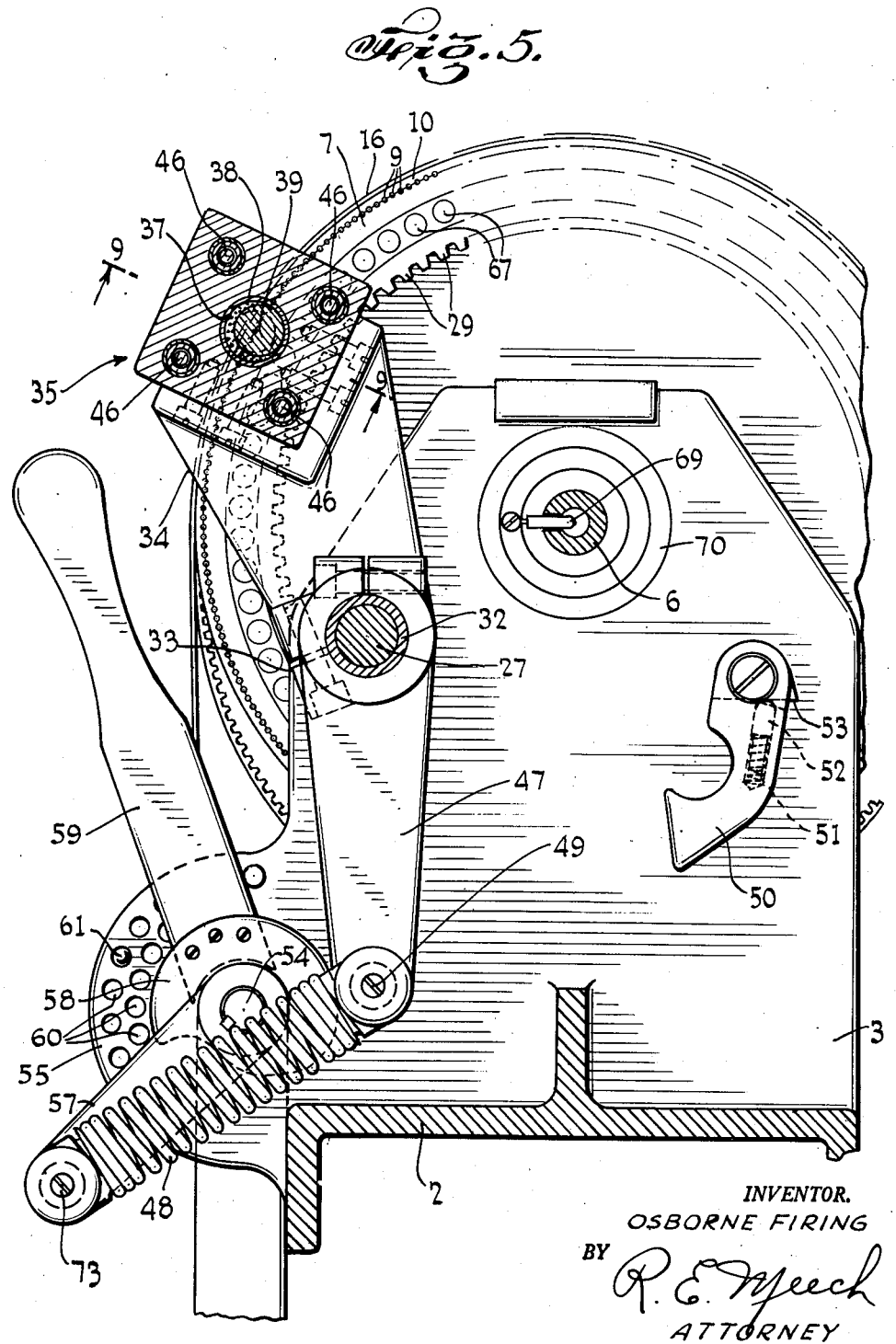

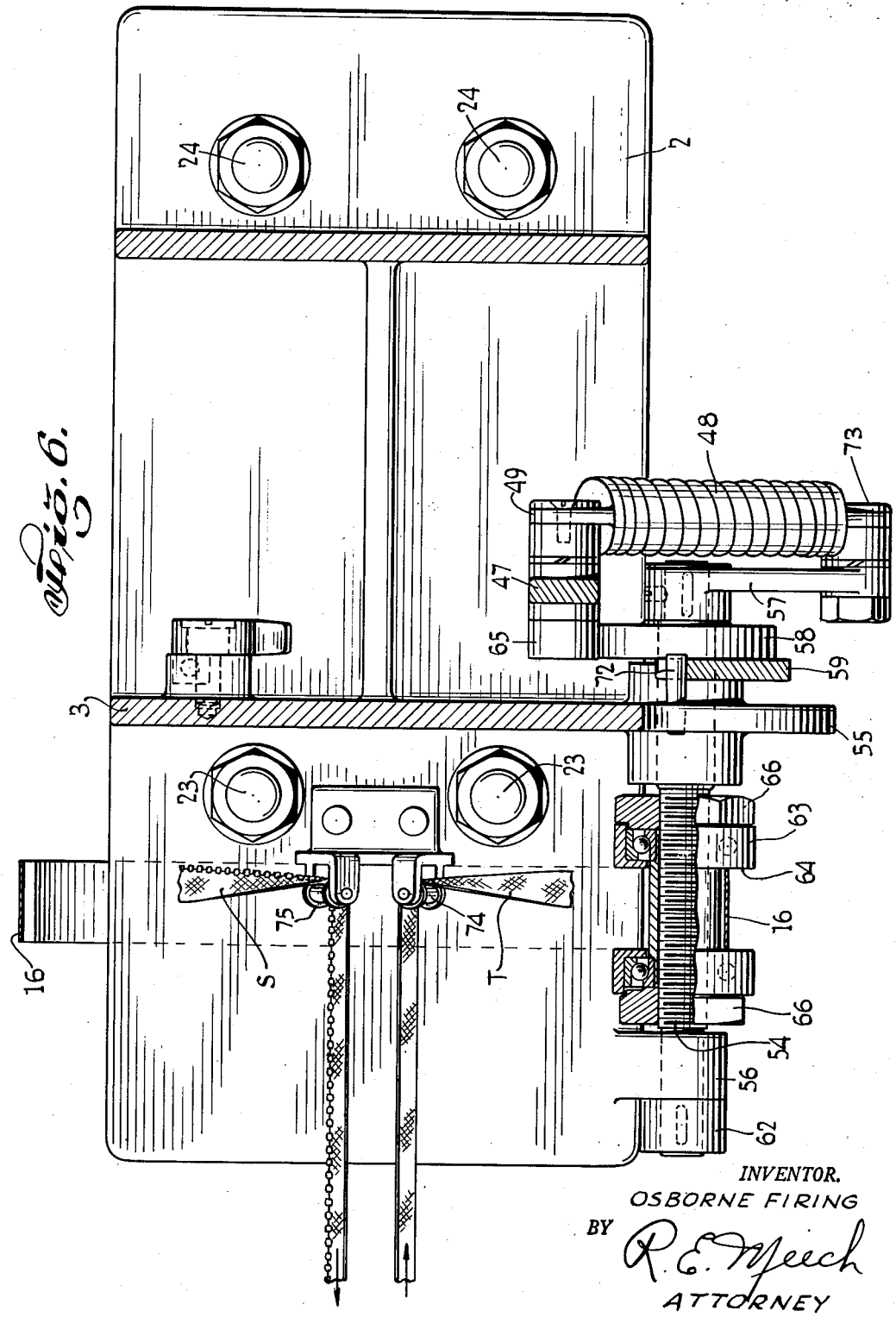

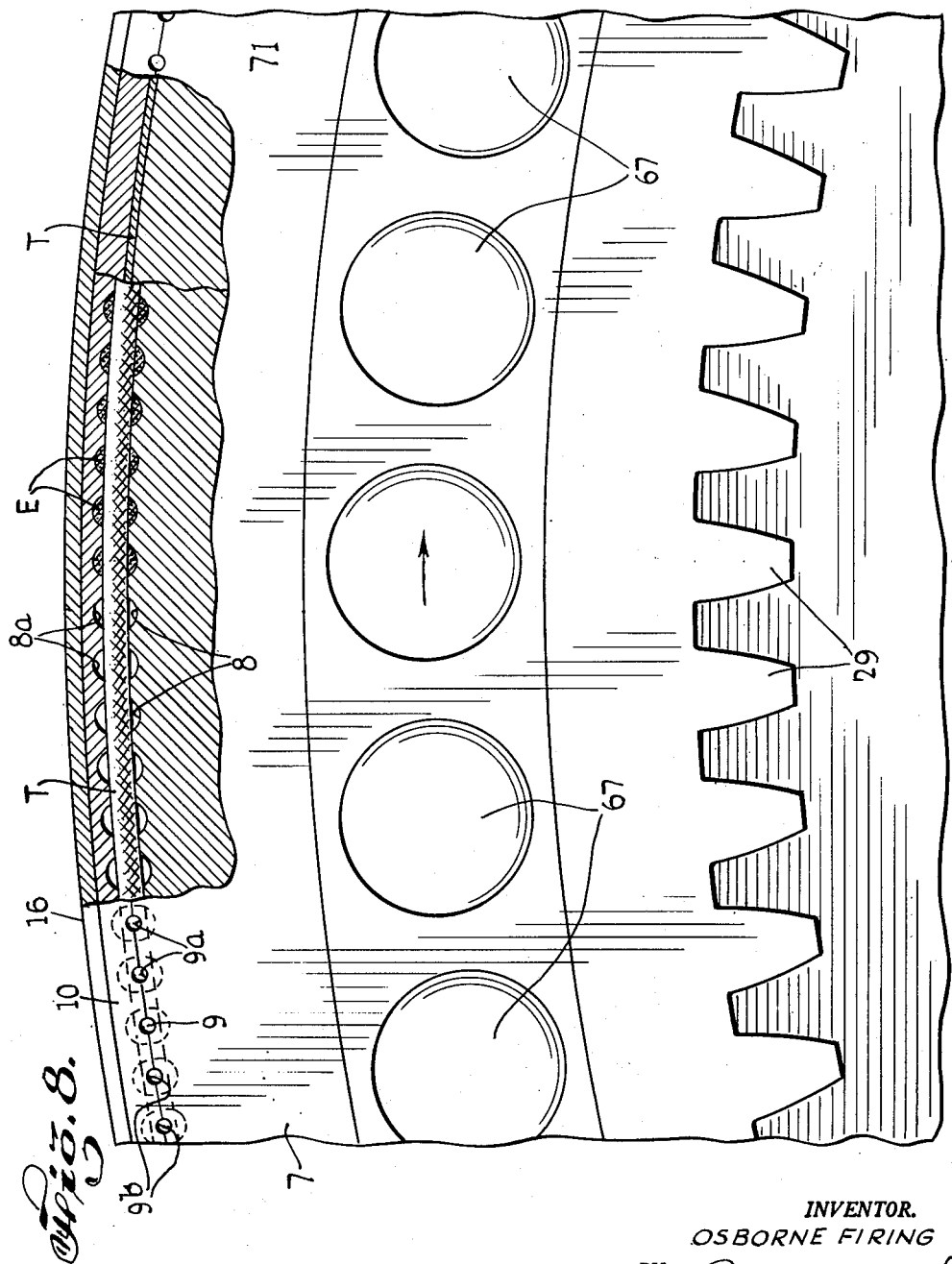

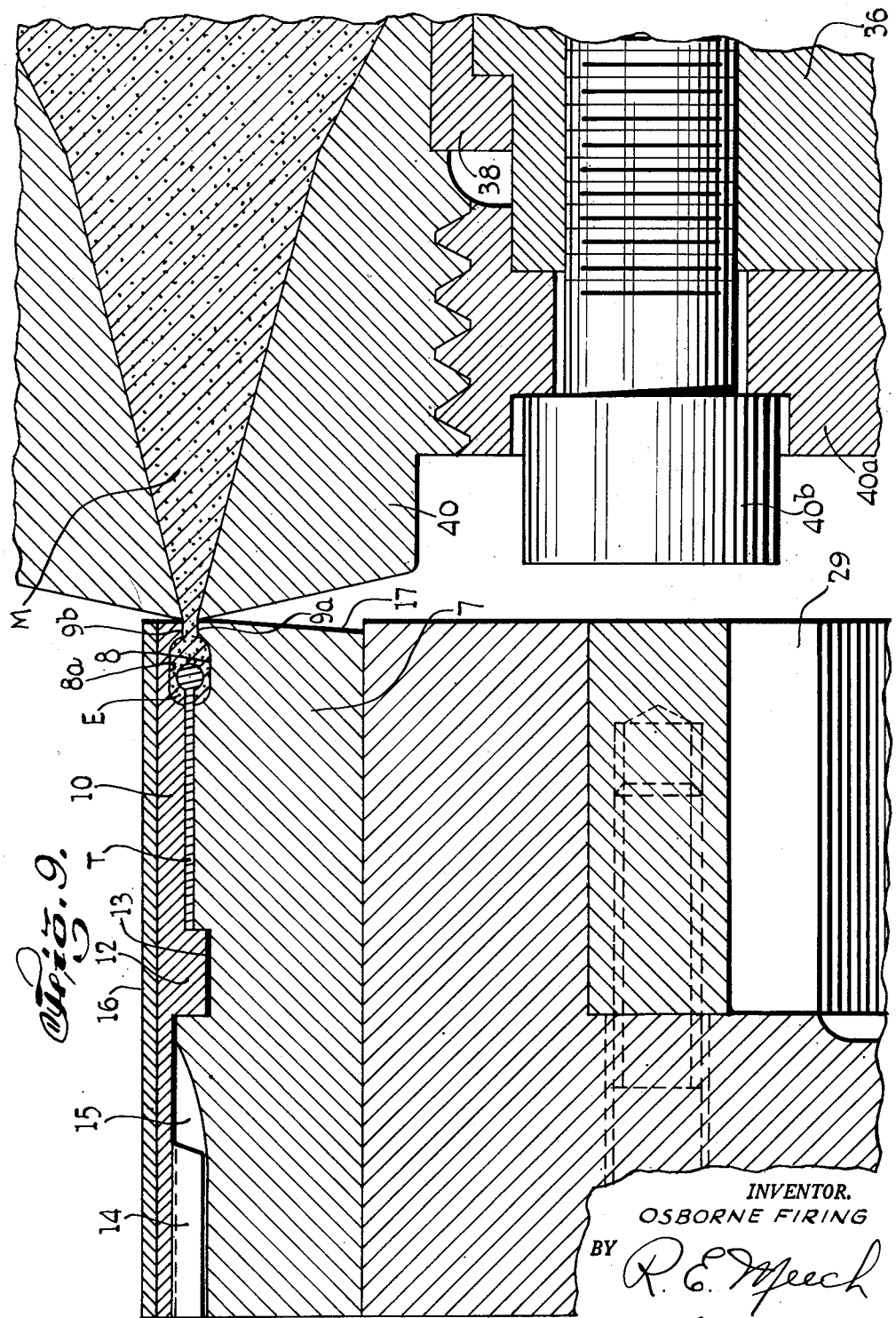

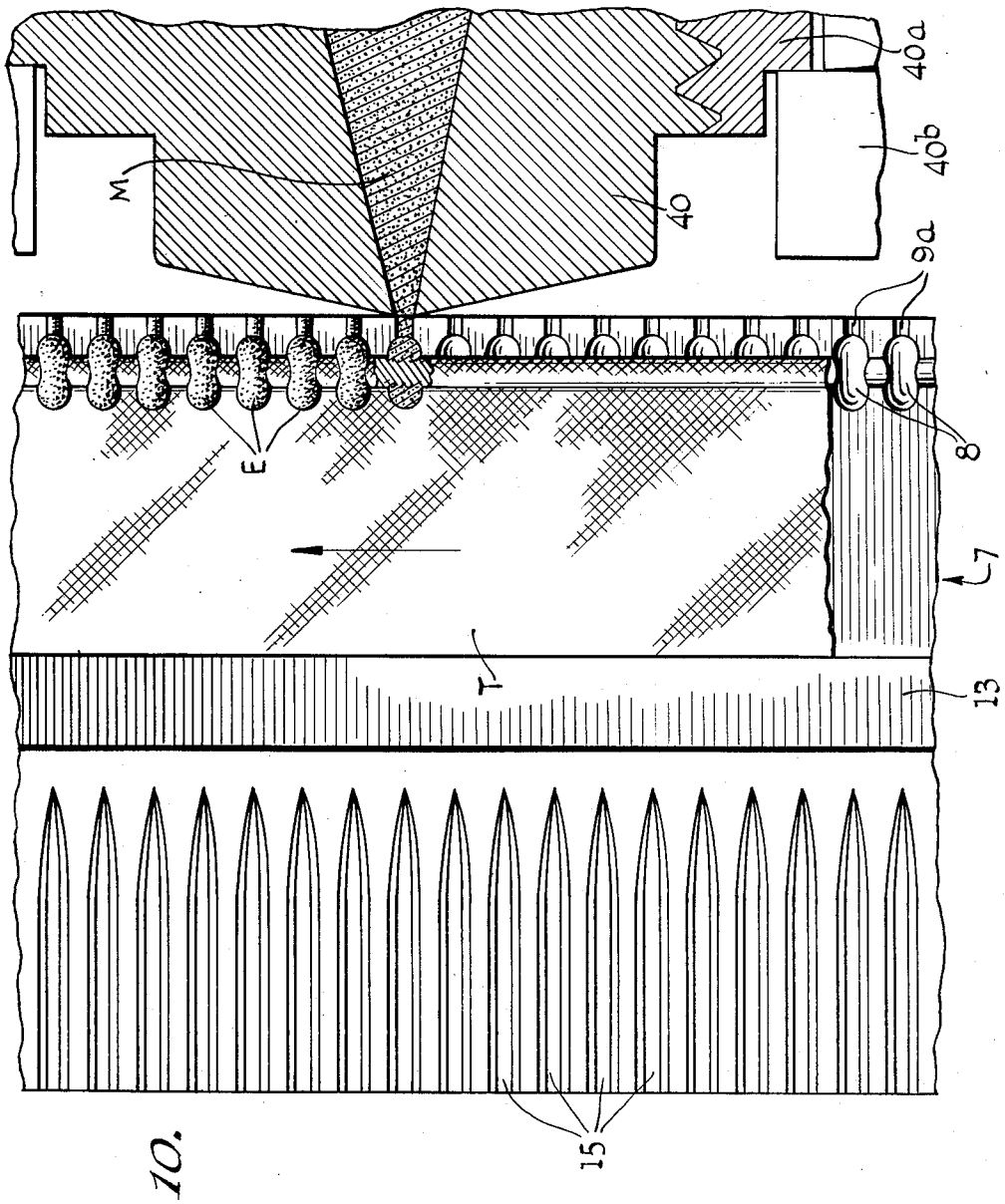

Patented June 13, 1950

2,511,402

UNITED STATES PATENT OFFICE 2,511,402

MACHINE FOR INJECTION MOLDING ARTICLES

Osborne Firing, New Dorp, N. Y., assignor to Talon, Inc., a corporation of Pennsylvania Application December 12, 1946, Serial No. 715,769

15 Claims. (Cl. 18—30)

This invention relates to a machine for molding a series of closely spaced articles on a carrier, and is designed particularly for molding interlocking fastener elements of slide fasteners of the type consisting of a flexible tape or mounting member having a plurality of spaced interlocking fastener elements secured thereto and adapted to interlock with the elements of an opposed stringer by the movement of a slider therealong. Such fasteners are in common use and are known generally as "zippers."

The machine of the present invention is particularly adaptable for the manufacture of small articles, such as fastener elements, directly to a tape or mounting member by injection molding. While metals having a relatively low melting point may be used in such molding, I prefer to use non-metallic plastic materials, either of the thermoplastic or thermosetting type. Heretofore, the molding of small articles, such as fastener elements, from a plastic material was a problem and uneconomical because of the necessary time element involved in the molding of each article or fastener element. In any injection molding operation, it is a well-known fact that a definite time cycle is required, the length of which is determined by the viscosity and type of molding material, the rate of heat dissipation from the die, and the molding pressure employed. When one fastener element is molded at a time, the rate of production of a finished fastener stringer, due to the long molding cycle required for each fastener element, is so low as to be impractical and expensive.

Various machines and apparatus have been heretofore suggested for practicing such injection molding, such as the molding of fastener elements directly onto a tape or mounting member. In most of these machines or apparatus each fastener element is molded on the tape between a pair of die members which receive the molding material from a nozzle either through a gate in the die members which form a sprue on the fastener elements which must be subsequently removed, or directly from the nozzle, in which case, even if no sprue is formed, a roughness is produced on the element which of course is objectionable, and, oftentimes, freezing of the molding material occurred in the nozzle between injection periods.

In the present invention there is provided a machine for molding fastener elements directly onto the tape or mounting member wherein no additional processing is required for providing a finished fastener stringer after the stringer leaves the molding machine and, at the same time, a machine in which there is provided a relatively long molding cycle for each fastener element.

It is the general object of the present invention to provide an improved machine for molding fastener elements directly onto a tape or mounting member which is continuous and automatic in its operation so as to provide a relatively high rate of production of finished fastener stringers.

It is a more specific object of the present invention to provide an improved machine for continuously molding fastener elements on a tape in which there is provided a rotatable member having mold cavities arranged around the periphery thereof with an annular member encircling the rotatable member to close the mold cavities with a flexible endless member encircling the annular member so as to maintain the same at all times in pressure contact with the periphery of the rotatable member throughout a substantially circumferential distance thereof so as to provide a relatively long molding cycle for each fastener element.

It is another object of the invention to provide an improved machine for continuously molding fastener elements on a tape by rotatable die members in which the molding material is supplied constantly to a nozzle under pressure, with the flow of the material to the dies being controlled by the movement of the die members relative to the nozzle.

It is a further object of this invention to provide an improved machine for continuously molding fastener elements on a tape which may be adapted to produce a succession of fastener stringers of desired length with the desired gap space therebetween wherein any danger of the molding material freezing in the nozzle is eliminated.

It is still another object of the invention to provide an improved machine for continuously molding fastener elements on a tape in which the section of die members in the vicinity of the mold cavities is heated constantly so as to eliminate any danger of the molding material being frozen in the passageways leading to the mold cavities.

Various other objects and advantages of this invention will be more apparent in the course of the following specification, and will be particularly pointed out in the appended claims.

In the accompanying drawings, there is shown for the purpose of illustration, one embodiment which my invention may assume in practice.

In these drawings:

Fig. 1 is a front elevational view of my improved machine;

Fig. 2 is a side elevational view thereof;

Fig. 3 is a rear elevational view of the machine;

Fig. 4 is a side elevational view, partly in section, of a portion of the upper part of the machine;

Fig. 5 is a sectional view taken on line 5—5 of Fig. 2;

Fig. 6 is a sectional view taken on line 6—6 of Fig. 2;

Fig. 7 is a longitudinal sectional view through the extruding means and nozzle;

Fig. 8 is an enlarged view of a section of the drum, annular member, and flexible member, as shown in Figs. 3 and 5, partly in section, to show the mold cavities;

Fig. 9 is an enlarged sectional view taken on line 9—9 of Fig. 5; and

Fig. 10 is a sectional view of the drum and the end of the nozzle with the annular and flexible members removed, showing how the fastener members are molded in the mold cavities.

Referring more particularly to the drawings, the improved machine of my invention comprises a base 2 having a pair of spaced-apart upwardly extending bracket portions 3 and 4 in the upper ends of which there is positioned suitable bearings 5 in which there is rotatably mounted a rotatable hollow shaft 6. There is mounted on one end of this shaft, a circular or drum-like member 7 having a plurality of spaced-apart mold cavities 8 arranged around the periphery thereof adjacent one edge of the same. Each of these mold cavities conforms to the shape of one half of a fastener element of any desired design. There is also arranged in the periphery of the drum 7 adjacent one side thereof, a plurality of semi-circular shaped grooves 9a with one communicating with each of the mold cavities 8 and opening into the side of the drum.

There is disposed around the drum-like member 7, an annular member 10 having a plurality of spaced-apart mold cavities 8a arranged around the inner periphery thereof, which cavities are similar to the mold cavities 8 in the drum-like member 7 with which they cooperate to form a complete mold cavity in a manner hereinafter to be described. It will be understood that each of the mold cavities 8a conforms to the other half of the fastener element. There is arranged around the inner periphery of the annular member 10 adjacent one side thereof, a plurality of semi-circular shaped grooves 9b similar to the feed passageways 9a in the circular member 7 with one communicating with each of the mold cavities 8a and which cooperate with the grooves 9a to provide circular passageways 9 for delivering the moldable material to the mold cavities. The annular member 10 is so constructed and arranged that the inner periphery thereof is in contact with the outer periphery of the drum-like member 7 substantially throughout 180 degrees of rotation of both of these members with the mold cavities 8 in the drum 7 cooperating with the complementary mold cavities 8a in the annular member 10 to form a complete mold cavity when the drum and annular member are in contact with each other. When the drum and annular member are in such contact relation to form the mold cavities, it will be seen that complete passages 9 are formed by the cooperation of the semi-circular grooves 9a in the drum 7 and the semi-circular grooves 9b in the annular member 10, which passages 9 open through the side walls of the drum 7 and annular member 10, as more clearly shown in Figs. 8, 9, and 10 of the drawings. The outer side wall of the circular member 7 is tapered inwardly, as at 11, from the aligned row of passages 9 for a purpose hereinafter to be described.

There is arranged around the inner periphery of the annular member 10 centrally thereof, a key-like flange portion 12 which cooperates with a similarly shaped slot 13 arranged around the outer periphery of the drum-like member 7, which flange portion and slot cooperate with each other and act as a keyway and slot for preventing any lateral movement of the annular member 10 relative to the drum 7. There is also arranged around the inner periphery of the annular member 10 adjacent the outer side thereof, a plurality of gear teeth 14 so as to provide an internal gear, which gear teeth mesh with a series of similar gear teeth 15 arranged around the outer periphery of the drum 7 at the outer side thereof. It is the purpose of the gear teeth 14 and 15 to drive the annular member 10 upon rotation of the annular member 7, and to insure that the complementary mold cavities 8 and 8a are properly in register with each other so as to provide complete and uniform mold cavities.

There is disposed around the outer periphery of the annular member 10, a flexible band-like member 16 which contacts the annular member substantially throughout 180 degrees. The band member is also disposed over and around an idle pulley 17 which is securely mounted on the end of a shaft 18. The shaft 18 is rotatably mounted in suitable bearings 19 and 20 carried by adjustable bracket members 21 and 22, respectively. The bracket member 21 is movably connected to a pair of parallel threaded stud members 23 which extend between the base 2 and a sub-base 2a, and the bracket member 22 is likewise connected to a pair of similar spaced-apart parallel threaded stud members 24 which also extend between the base 2 and the sub-base 2a. There is arranged on each of the threaded stud members 23 to either side of the bracket member 21, an adjusting nut 25 and on each of the threaded stud members 24 to either side of the bracket 22, there is arranged a similar adjusting nut 26. It is the purpose of the nuts 25 and 26 to adjust the position of the brackets 21 and 22 along the respective stud-like members 23 and 24 so as to adjust the tension in the flexible member 16.

Directly below the shaft 6 and parallel thereto, there is rotatably arranged in the brackets 3 and 4, a drive shaft 27 on one end of which there is securely arranged a gear 28 which is disposed within the drum member 7 and meshes with a series of gear teeth 29 arranged around the inner periphery thereof so as to provide an internal gear arrangement. On the opposite end of the shaft 27, there is securely arranged preferably a sprocket 30 over and around which a chain 31 is disposed which is connected to the shaft of a motor or other suitable source of power (not shown) for driving the same. It will be seen that as the shaft 27 is rotated, the drum member 7, together with the annular member 10 and the flexible member 16, will be driven through the action of the gear 28, internal gear 29, and the gear teeth 14 and 15 carried by the drum 7 and annular member 10, respectively, and that the flexible member 16 will be driven in turn by the annular member 10 due to its frictional contact therewith.

There is arranged around the shaft 27 and for free rotatable movement relative thereto, a sleeve-like member 32 to which there is attached a pair of spaced-apart bracket members 33. There is mounted on each of the bracket members 33, another bracket member 34 on top of which there is mounted a moldable material injection means 35 which is adapted to supply the moldable material to the mold cavities in a manner to be described. The member 35, as more clearly shown in Fig. 7 of the drawings, consists of a rectangular-shaped body member 36 having an axial bore 37 which is preferably lined with a tubular member 38 of a wear-resisting material. There is arranged within the bore 37 and the tubular lining member 38, an elongated rotatable feed screw 39 which extends substantially throughout the length of the body member. On one end of the body member there is arranged in the end of the bore 37, an injection nozzle 40 through which the material is forced by means of the screw 39 into the mold cavities 8 and 8a, as will be later explained. The nozzle is preferably screwed into a collar 40a which is secured to the end of the body member 36 by means of the screws 40b. At the opposite end of the body member, the screw 39 terminates in a shaft portion 41 to which there is keyed a relatively large gear 42 which meshes with a gear 43 arranged on the outer end of the drive shaft 27. When the drive shaft 27 is driven, it will be seen that the screw 39 is rotated by means of the gears 42 and 43 thereby moving the material through the bore 37 of the body member 36 towards the nozzle 40. There is arranged in the upper wall of the body member 36, an opening 44 through which the moldable material is fed into the bore 37 around the screw 39 arranged therein. At the extreme end of the screw 39, there is arranged in the lower wall of the body member 36, an opening 45 for delivering the moldable material from the bore by reversing the driving action of the screw 39 when it is desired to empty the bore 37 of any excess moldable material after any particular molding operation so that it will not solidify therein. There is also arranged in the body member 36 and extending longitudinally thereof, a plurality of electrical resistance heating elements 46, four in the present instance, for the purpose of heating the body member 36 which in turn heats the moldable material disposed in the bore 37 of the body member.

As more clearly shown in Figs. 2 and 5, there is also securely attached to the sleeve-like member 32, a downwardly extending lever 47 to the lower end of which there is pivotally attached, as at 49, the inner end of a relatively heavy coil spring 48. There is pivotally mounted on the side of the bracket 3, a hook-like latch member 50 to lock the member 35 in its inoperative position in a manner to be described. There is arranged in a hole in the latch member 50, a compression coil spring 51 which acts against a pin 52 arranged in the hole with the end of the pin abutting against a shoulder 53 carried by the side of the bracket 3 to maintain the latch in its forwardmost position so as to engage the roller 49 when the roller is moved to position to engage the same.

There is also arranged on the base 2, a stud shaft 54 which is rotatably mounted in an arcuate-shaped extension 55 of the bracket 3 and a bracket portion 56 on the base 2 forwardly thereof. On the inner end of shaft 54, there is securely arranged a crank-like member 57 to which the outer end of the coil spring 48 is pivotally attached, as at 73. There is also arranged on the shaft 54 directly next to the crank 57, a cam member 58 which is freely rotatable relative thereto and there is attached to this cam, a lever-like handle member 59 for manually positioning the cam 58 in a manner and for a purpose later to be described. The cam 58 cooperates with a cam follower in the form of a roller 65 positioned on the lower end of the lever 47 next to the inner end of the spring 48. There is arranged in the arcuate-shaped extension 55, two rows of spaced-apart holes 60 with the holes in one row being staggered relative to the holes in the other row. There is adapted to be selectively arranged in any one of these holes, a pin member 61 which cooperates with the lower side of the lever arm 59 for a purpose and in a manner hereinafter to be explained. There is arranged at the top of this extension, a stop in the form of a pin 72, for limiting the upward movement of the handle 59. There is secured to the opposite end of the shaft 54 forwardly of the base 2, a manually-operated lever-like handle member 62 for the purpose of rotating the shaft 54 to move the member 35 to and from its operative position when desired due to the action of the lever 57, the spring 48, and the lever 47. As more clearly shown in Fig. 6, intermediate the length of the shaft 54, there is arranged thereon a collar-like member 63 having a guide groove 64 arranged around the periphery thereof in which the flexible band 16 is disposed and which is adapted to guide the band in its travel. The collar-like member 63 is adjustable along the shaft 54 by means of a pair of nuts 66 with one positioned at each end of this member with the nuts cooperating with a threaded portion of the shaft 54.

There is positioned around the drum-like member 7 at a point adjacent the mold cavities 9 therein, a series of spaced-apart resistance heating elements 67 for the purpose of maintaining the periphery of the drum 7 together with the mold cavities and passages therein at a uniform temperature. These elements 67 are heated by a pair of circular wires 68 arranged around the face of the drum which are connected by means of wires 69 to collector rings 70 secured to the shaft 6 with the wires 69 passing into and through the end of the shaft 6 to the collector rings 70 which are positioned intermediate the length thereof. These collector rings cooperate with brushes (not shown) which are connected to a suitable source of electrical power.

The operation of my machine will now be described. The carrier or flexible tape T on which the articles or fastener elements are to be molded, is positioned in the machine between the drum 7 and the annular member 10 with the bead of the tape positioned in the mold cavities 8 and 8a with a space therearound. The tape passes from the source of supply around a guide roller 74, around the periphery of the drum 7, and out around a roller guide member 75. The idle roller 17 is first adjusted by means of the adjusting nuts 25 and 26 on the studs 23 and 24, respectively, so that the flexible band member 16 is under the proper tension. It will be understood that this band member 16 bears against the outer side of the annular member 10 so that the annular member is forced against the outer periphery of the drum 7 with the proper pressure during the molding operation.

It will be assumed that the injection means 35 is in its molding position, and in such position, the bore of the nozzle 40 is positioned in alignment with the series of passages 9 in the side of the drum and annular member, as shown in Figs. 1, 5, 9, and 10 of the drawings. It will be understood that the end of the nozzle throughout the molding operation bears against the side of the drum 7 and the annular member 10, as shown in Figs. 9 and 10, and it will be seen that as the drum and annular member rotate, the space between the passages 9 will act as a valve to stop the flow of material from the nozzle when the same is out of register with the passages 9. The machine is then set in operation, and it will be seen as the drum 7 is rotated through the action of the sprocket 30, the shaft 27, the gear 28, and the internal gear 29 of the drum that the annular member 10 in turn will be rotated due to the action of the gear teeth 14 and 15, and that the flexible band member 16 which contacts the outer periphery of the annular member 10 will be driven frictionally thereby. The shaft 27 also drives the feed screw 39 through the action of the gears 42 and 43. When the nozzle is in its injection position, it will be understood that the spring member 48 is under tension and maintains the cam roller 65 against the cam 58. It is this cam that positions the nozzle 40 in alignment with the passages 9. When the lever 59 which is connected to this cam 58 is in its uppermost position against the stop pin 72, as shown in Figs. 1, 5, and 6, it will be understood that the high point of the cam 58 is in contact with the roller 65, thereby positioning the nozzle in registry alignment with the passages 9.

The moldable material M, such as styrene, nylon or some other suitable thremosetting material is then delivered from a hopper or some other suitable means into the bore 37 of the body member 36 of the injection means through the opening 44 therein, as shown in Fig. 7. As the screw 39 rotates, the moldable material is carried through the bore and forced under pressure through the nozzle 40 into the mold cavities 8 and 8a by means of this screw 39. It will be seen that the moldable material is forced into the cavities 8 and 8a in the space around the beaded edge of the tape, so that the material is securely molded therearound. After the moldable material has been injected through the passage 9 leading to one series of molds to form an article or fastener element E, the nozzle is brought into register with the next successive passage 9 leading to the next set of mold cavities due to the fact that the drum member 7 and the annular member 10 are continuously in rotation. It, of course, will be understood that the drum 7 and the annular member 10 rotate in timed relation to the feeding of the material through the nozzle 40 by the screw 39 so that a sufficient amount of material is delivered to each of the mold cavities as the drum and annular member rotate. It will be seen that the two halves of the mold cavities are closed to form a complete mold cavity substantially throughout 180 degrees of rotation of the drum 7 and the annular member 10. This is important as it provides sufficient time for the elements to be cured and securely affixed to the tape.

The molding of the elements on the tape is continued as above described until the desired number of elements E are molded to the edge of the tape to provide the desired length of fastener stringer S. At this point, the cam member 58 is manipulated by means of the handle 59 so as to move the cam in a counter-clockwise direction, as shown in Figs. 3 and 5. Such movement of the cam 58 brings a low point of the cam in contact with the roller 65 thereby permitting the injection means 35 to move inwardly toward the center of the drum 7 in a clockwise direction, as shown in Fig. 5, due to the action of the spring 58 which is connected to the lower end of the lever 47, thus, rotating the sleeve member 32 relative to the shaft 27 which in turn moves the brackets 33 and 34, together with the injection means 35, in a clockwise direction. On such movement of the injection means, it will be seen that the bore of the nozzle 40 is moved out of alignment with the series of passages 9 to position opposite the tapered surface 71 around the inner face of the drum member 7. With the nozzle in such position, it will be seen that a space is provided on the inner side of the bore of the nozzle 40 between the end of the same and the tapered surface 71 thereby permitting bleeding of the moldable material from the nozzle and the bore of the injection means so that the material will not solidify in either the nozzle or the injection means. After the desired gap space is provided along the tape, the cam member is again rotated about the shaft 54 so as to again bring the high point of the cam in contact with the roller 65, at which time, the bore of the nozzle 40 is again positioned in alignment with the passages 9 for continuing the injection molding of fastener elements along the tape, as hereinbefore described.

The two rows of holes 60 in the extension 55 are provided for selectively placing a pin 61 therein which acts as a stop for the handle 59 when the cam 58 is rotated to position for the above described bleeding operation. That is, the handle is moved downwardly against the pin which positions the nozzle for bleeding. The distance the nozzle is moved out of alignment with the passages 9 and along the tapered surface 71, and, of course, the position of the pin 61 depends upon the temperature of the mold cavities, the speed of molding, and the characteristics of the material being molded.

After the molding operation, the injection molding means 35 is moved in a counter-clockwise direction, as shown in Fig. 3, so that the nozzle moves out of contact with the side of the drum 7 and the annular member 10 to its retracted position, by means of the handle 62 which rotates the shaft 54 which in turn rotates the lever 57 thereby unloading the spring 48 and permitting the injection molding means to drop down due to the weight thereof. Upon such movement of the handle 62, the lever arm 47 moves counterclockwise, as shown in Fig. 5, and the roller 65 engages the latch 50 so as to hold the injection means 35 in its retracted position.

If it is desired to remove the moldable material from the bore 37 of the body member 36, the screw 39 is rotated in a reverse direction with the moldable material passing outwardly down through the opening 35 in the bottom of the body member 36. The nozzle 40 can then be taken off and cleaned by removing the screw 43 and collar 40a.

As a result of my invention it will be seen that there is provided an injection molding machine which is not only simple and inexpensive in its construction but efficient and effective in its use so as to produce fastener stringers continuously at a minimum cost without the use of expensive molds and cores.

While I have shown and described an embodiment which my invention may assume in practice, it will be understood that this embodiment is merely for the purpose of illustration and description, and that other forms may be devised within the scope of my invention as defined in the appended claims.

What I claim as my invention is:

1. A machine for injection molding fastener elements directly onto a flexible mounting member comprising a rotatable drum having a series of spaced-apart mold cavities formed in and around the periphery thereof, a rotatable annular member having an inner diameter substantially larger than the outer diameter of said drum disposed therearound so as to encircle the same with the inner periphery of said annular member contacting the outer periphery of said drum for a substantial circumferential distance, said annular member having a series of spaced-apart complementary mold cavities formed in and around the inner periphery thereof which register with the mold cavities in the outer periphery of said drum, the mounting member adapted to be disposed between said drum and said annular member in the vicinity that said annular member contacts said drum, a flexible endless band encircling said annular member and said drum and contacting the outer periphery of the former in the vicinity that said annular member contacts said drum, said flexible band adapted to maintain said annular member in pressure contact with the outer periphery of said drum, and means for introducing a moldable material into the mold cavities in the vicinity of contact of said annular member with said drum.

2. A machine for injection molding fastener elements directly onto a flexible mounting member, as defined in claim 1, wherein the means for introducing a moldable material into the mold cavities includes a series of spaced-apart passageways arranged in the side wall of the drum adjacent the periphery thereof with each passageway communicating with one of the mold cavities, and a nozzle arranged on the same side of said drum as said passageways connected to a source of molding material supply under pressure, the open end of said nozzle contacting the side wall of said drum so that the material is forced into said mold cavities successively when said nozzle is in registry with said passageways.

3. A machine for injection molding fastener elements directly onto a flexible mounting member, as defined in claim 1, wherein the means for introducing the moldable material into the mold cavities includes a series of spaced-apart passageways arranged in the side wall of the drum adjacent the periphery thereof with each passageway communicating with one of the mold cavities and being arranged in alignment concentric with the axis of said drum, and a nozzle arranged on the same side of said drum as said passageways connected to a source of molding material supply under pressure with the open end of said nozzle contacting the side wall of said drum, said drum being rotatable relative to said nozzle to bring said passageways successively into or out of registry with said nozzle whereby the mold cavities are filled during registry of said passageways with said nozzle and cut off from the injection pressure by that portion of the side wall of said drum between said passageways when out of registry with said nozzle.

4. A machine for injection molding fastener elements directly onto a flexible mounting member comprising a rotatable drum having a series of spaced-apart mold cavities formed in and around the periphery thereof, a rotatable annular member having an inner diameter substantially larger than the outer diameter of said drum disposed therearound so as to encircle the same with the inner periphery of said annular member contacting the outer periphery of said drum for a distance of approximately 180 degrees, said annular member having a series of spaced-apart complementary mold cavities formed in and around the inner periphery thereof which register with the mold cavities in the outer periphery of said drum, a flexible endless band encircling said annular member and said drum and contacting the outer periphery thereof for a distance of approximately 180 degrees in the vicinity that said annular member contacts said drum, said flexible band adapted to maintain said annular member securely in pressure contact with the outer periphery of said drum, a mounting member guideway arranged around the periphery of said drum with said annular member adapted to embrace the mounting member and to hold it securely in position between the same and said drum, and means for introducing a molding material into the mold cavities in the vicinity of contact of said annular member with said drum.

5. A machine for injection molding fastener elements directly onto a flexible mounting member, as defined in claim 4, wherein the means for introducing the molding material into the mold cavities consists of a nozzle arranged to one side of the drum connected to a source of a molding material supply with the open end of said nozzle contacting the side wall of said drum, which nozzle is adapted to register with a series of passageways opening into the side wall of said drum which communicate with the mold cavities, said nozzle being positioned at a point in the vicinity that said annular member initially contacts the outer periphery of said drum in its rotatable travel.

6. A machine for injection molding fastener elements directly onto a mounting member comprising a rotatable drum having a series of spaced-apart mold cavities formed in and around the periphery thereof, a rotatable annular member having an inner diameter substantially larger than the outer diameter of said drum disposed therearound so as to encircle the same with the inner periphery of said annular member contacting the outer periphery of said drum for a substantial circumferential distance, said annular member having a series of spaced-apart complementary mold cavities formed in and around the inner periphery thereof which register with the mold cavities in the outer periphery of said drum, said annular member having a series of gear teeth arranged around the inner periphery thereof which mesh with a series of corresponding gear teeth arranged around the outer periphery of said drum so as to insure that the mold cavities of said annular member and said drum are in register, said drum upon rotation adapted to drive said annular member through the action of said gear teeth, said annular member adapted to embrace the mounting member in the vicinity that the annular member contacts said drum, a flexible endless band encircling said annular member and said drum and contacting the outer periphery of the former in the vicinity that said annular member contacts said drum, and means for introducing a molding material into said mold cavities in the vicinity of contact of said annular member with said drum during the rotation of said drum and said annular member.

7. A machine for injection molding fastener elements directly onto a mounting member, as defined in claim 6, wherein the means for introducing the molding material into the mold cavities consists of a nozzle arranged to one side of said drum connected to a source of molding material supply with the open end of said nozzle contacting the side wall of said drum, which nozzle is adapted to register with a series of aligned passageways opening into the side wall of said drum which communicate with the mold cavities, said molding material being under pressure and adapted to flow automatically into the mold cavities successively as the drum and annular member rotate.

8. A machine for injection molding fastener elements directly onto a flexible mounting member comprising a rotatable circular member having a series of spaced-apart mold cavities formed in and around the periphery thereof, a rotatable member encircling said circular member and contacting a portion of the outer periphery of said circular member and in pressure contact therewith which acts as one wall for said mold cavities and which is adapted to embrace the mounting member between said means and said circular member, means for delivering and guiding a mounting member between said circular member and said rotatable member at the point of contact therebetween, a separate passageway for each mold cavity opening through the side wall of said circular member with the openings for all of said passageways being spaced apart and in alignment with each other, means for injecting moldable material into said cavities including a nozzle arranged to one side of and in contact with the side wall of said circular member at a point adjacent the contact of said circular member with said rotatable member, said circular member adapted to be rotated so as to bring said openings in turn into registry with said nozzle, the molding material adapted to be under pressure and to flow automatically into said mold cavities with the outer surface of the side wall of said circular member between said openings acting as a valve to prevent flow of moldable material from said nozzle when said openings are successively moved out of registry with said nozzle, and rotatable annular means encircling both said rotatable member and said circular member and contacting the outer periphery of the former in the vicinity that said rotatable member contacts said circular member, said annular means adapted to maintain said rotatable member in pressure contact with the outer periphery of said circular member.

9. A machine for injection molding fastener elements directly onto a flexible mounting member comprising a circular rotatable member having a series of spaced-apart mold cavities formed in and around the periphery thereof, a rotatable annular member having an inner diameter substantially larger than the outer diameter of said circular member and disposed therearound so as to encircle the same with the inner periphery of said annular member contacting the outer periphery of said circular member for a substantial circumferential distance, the inner periphery of said annular member adapted to cooperate with the outer periphery of said circular member to close the mold cavities therein when said members are in circumferential contact with each other, means for delivering and guiding a mounting member between said circular member and said annular member at the point of contact therebetween a separate passageway for each mold cavity opening through the side wall of said circular member with the openings for all of said passageways being spaced apart and arranged in alignment concentrically around the side wall of said circular member, means for injecting moldable material into said cavities including a movable nozzle arranged to one side of and in contact with the side wall of said circular member at a point directly opposite the openings of said passageways therein, said circular member adapted to be rotated to bring said openings in turn into registry with said nozzle, the moldable material adapted to be under pressure and to flow automatically into said mold cavities with the outer surface of the side wall between said openings acting as a valve to prevent flow of the moldable material from said nozzle when said openings are successively moved out of registry with said nozzle, and rotatable annular means encircling both said rotatable member and said circular member and contacting the outer periphery of the former in the vicinity that said rotatable member contacts said circular member, said annular means adapted to maintain said rotatable member in pressure contact with the outer periphery of said circular member.

10. A machine for injection molding fastener elements, as defined in claim 9, wherein the side wall of the circular member is tapered inwardly thereof from a point adjacent the series of aligned openings in said side wall so as to permit bleeding of the moldable material from the nozzle when the same is moved inwardly toward the center of the circular member and out of alignment with said openings.

11. A machine for injection molding fastener elements, as defined in claim 9, including means for bleeding of the moldable material from the nozzle, and means for adjusting the amount of such bleeding depending upon the material being molded, and the consistency and temperature of such material.

12. A machine for injection molding fastener elements, as defined in claim 9, including means for heating the drum in the vicinity of the mold cavities therearound, so as to maintain the same at a predetermined temperature.

13. A machine for injection molding fastener elements, as defined in claim 9, wherein the nozzle is mounted on a pivotal member whereby the nozzle may be moved out of alignment with the series of openings in the side wall of the drum to one position to permit bleeding of the moldable material from the nozzle and to another retracted position when the nozzle is not in use, and means for moving said nozzle to either of said positions.

14. A machine for injection molding fastener elements directly onto a flexible mounting member comprising a rotatable drum having a series of spaced-apart mold cavities formed in and around the periphery thereof, a rotatable annular member having an inner diameter substantially larger than the outer diameter of said drum disposed therearound so as to encircle the same with the inner periphery of said annular member contacting the outer periphery of said drum for a substantial circumferential distance, said annular member having a series of spaced-apart complementary mold cavities formed in and around the inner periphery thereof which register with the mold cavities in the outer periphery of said drum, the mounting member adapted to be disposed between said drum and said annular member in the vicinity that said annular member contacts said drum, rotatable annular means positioned on the outer side of said annular member encircling the same so as to maintain said annular member in pressure contact with the outer periphery of said drum, and means for introducing a moldable material into the mold cavities in the vicinity of contact of said annular member with said drum.

15. A machine for injection molding fastener elements onto a flexible mounting member, as defined in claim 8, including means carried by the rotatable circular member adjacent the mold cavities therein for heating the periphery of the rotatable circular member in the vicinity of said mold cavities so as to maintain the same at a uniform temperature.

OSBORNE FIRING.

REFERENCES CITED

The following references are of record in the file of this patent:

UNITED STATES PATENTS

| Number | Name | Date |
|---|---|---|
| 844,330 | Cole | Feb. 19, 1907 |
| 1,931,759 | Hasing | Oct. 24, 1933 |
| 2,197,968 | De Mattia | Apr. 23, 1940 |
| 2,230,785 | Sundback | Feb. 4, 1941 |
| 2,282,308 | Dahlin | May 12, 1942 |
| 2,402,805 | Cousino | June 25, 1946 |

FOREIGN PATENTS

| Number | Country | Date |
|---|---|---|
| 201,079 | Germany | June 19, 1907 |